Patented Feb. 5, 1935

1,989,699

UNITED STATES PATENT OFFICE 1,989,699

NEUTRAL CRESYLIC ACID ESTER OF PHTHALIC ACID AND METHOD OF MANUFACTURING THE SAME

Lucas P. Kyrides, Webster Groves, Mo., assignor, by mesne assignments, to Monsanto Chemical Company, a corporation of Delaware No Drawing. Application January 30, 1932, Serial No. 589,978

3 Claims. (Cl. 260—103)

This invention relates to novel esters of dicarboxylic acids, and phenols of the benzene series, which may be made advantageously by reacting the acid chloride of the desired acid with the mixture of phenols or their alkali metal salts. The acids contemplated by this invention include phthalic, chlorphthalic, succinic, etc.; the phenols include phenol, that is monohydroxy benzene, para cresol, meta cresol, ortho cresol, the xylenols, orthochlor phenol, parachlor phenol, etc.

The ester products are characterized by their low melting point, stability, low vapor pressure under ordinary conditions, as well as their fortuitous characteristics which are manifest when utilized in the plastic arts as set forth more fully hereinafter. Upon hydrolysis, they yield a mixture of phenols, yet they appear to be a homogeneous mixture of mixed phenyl esters which are inseparable into simple esters, such as the diphenyl, diortho cresyl or dipara cresyl esters.

In the refining of coal tars, there is obtained a cresylic acid fraction, which consists of a mixture of phenol, ortho cresol, para cresol, meta cresol, and xylenols admixed with numerable related compositions. By careful fractionation, it is possible to separate phenol in a relatively pure state. It is likewise possible to separate xylenol from the cresols, and thereafter to separate the orthocresol from the para and meta cresols. However, it is customary to separate only the phenol, and thereafter to dispose of the cresols, usually admixed with substantial quantities of xylenols, for purposes which do not require a chemically pure or even technically pure single chemical entity.

I have now found that the mixture of cresols, such as is obtainable on the market, and which may consist principally of meta and para cresol, or may include the ortho isomer as well as the higher boiling phenolic constituents, notably, the xylenols, may be caused to react with the acid chlorides of dicarboxylic acids to produce a product having a relatively low melting point, which is colorless, stable to the influence of ordinary atmospheric conditions, of high boiling point, insoluble in water, and otherwise well adapted for use in the arts. Furthermore, one may vary the proportion of the various isomers over a relatively wide range without affecting substantially the physical characteristics of the ultimate product. For example, cresol which consists essentially of meta and para cresol and from which the ortho isomer has been removed, reacts to form a product whose properties resemble closely the properties obtained when a mixture of all three isomers is employed. The fact that these various grades of cresylic acid may be employed without affecting substantially the physical characteristics of the ultimate product is particularly advantageous since it enables one to utilize various grades of cresols and xylenols from which constituents normally present therein, are removed in whole or in part. Moreover, the method of preparation is analogous and the procedure employed need not be revised with each change in the phenol composition.

The following examples illustrate embodiments of the invention:

*Example 1.*—Two molar proportions of anhydrous freshly distilled cresylic acid having a boiling point range of 198°–213° from which a substantial quantity of ortho cresol, normally present therein, has previously been separated as by fractionation, are agitated and maintained at approximately 80° C. while there is added slowly one molar proportion or slightly less of phthalyl chloride. After all of the chloride has been added and the evolution of hydrogen chloride has subsided, the temperature is raised to 110°–140° to insure the completion of the reaction. The product is then cooled and washed with a dilute aqueous solution (approximately 2%) of caustic soda whereby the unreacted phthalyl chloride, phthalic anhydride, hydrogen chloride, and cresylic acid is dissolved and separated from the ester. The excess alkali is then removed by washing with water. Any coloration which may have developed is removed by means of an absorbent or decolorizing agent, such as charcoal, fuller's earth, etc., or by distillation, preferably under reduced pressure.

*Example 2.*—A mixture containing all three cresols as they are obtained from the refining of cresylic acid having a boiling point range of 190°–212° C. may be reacted with phthalyl chloride in a manner substantially as indicated in Example 1. The product so obtained will be found to be a liquid which upon long standing crystallizes and which liquefies at slightly elevated temperatures. A small quantity of phenol is usually present in the cresylic acid of the grade specified hereinabove. However, if desired, an additional quantity of phenol may be added whereby one obtains a product which is not a true mixed cresyl phthalate, but rather is a mixed cresyl phenyl phthalate. The properties will, however, not be changed materially.

*Example 3.*—A cresylic acid having a boiling point of 190°–250° C. approximately 95% of which distills between 213°–247° C. is caused to react with phthalyl chloride in a manner analogous to that described in Example 1. Evolution of the hydrogen chloride if sluggish and apparently incomplete may be facilitated by raising the temperature of the reaction mixture.

*Example 4.*—A mixed ester of succinic acid may be produced by adding a molar proportion of succinyl chloride to two molar proportions of cresol, such as is set forth in Example 1, and following in general the procedure set forth in Example 1.

The esters contemplated by this invention, and particularly the aromatic dicarboxylic acid and saturated aliphatic acid esters lend themselves readily to a permanganate purification treatment by which an odorless and substantially colorless product is obtained, which is stable to the influence of the ordinary atmospheric conditions, and is well adapted for use in the manufacture of plastics, notably, notrocellulose compositions. For this purpose, the neutral ester from which the unreacted acid chloride and free phenolic compositions have been removed, preferably by washing, at ordinary temperatures, with a dilute aqueous alkali solution is agitated for 10–20 hours with a dilute aqueous permanganate solution, such, for example, as sodium permanganate or potassium permanganate. The time of treatment as well as the quantity of permanganate employed will vary with the quality of cresylic acid employed in the manufacture of the ester, and can be determined most conveniently by actual trial. In general, I have found that 1% of potassium permanganate based on the quantity of ester being treated which is dissolved in water to give a 1–2% solution is satisfactory and sufficient. Ordinary temperature conditions may be employed. The permanganate treatment is complete when after several hours agitation a distinct permanganate coloration persists in the aqueous fraction.

Manganese dioxide is precipitated in the course of this treatment which can be removed conveniently by the addition of a sulfur dioxide or a sulfite preferably in the presence of a small quantity of sulfuric acid. If desired, precipitated manganese dioxide may be separated by filtration. In either instance, the ester is washed carefully with water to remove all the water soluble materials. The purified ester product is then dried by the application of heat and preferably under reduced pressure.

The aforedescribed method of purification is applicable to the purifications of diphenyl phthalate and similar esters which otherwise are not contemplated by the present invention.

The compositions hereinabove described may be employed wherever an ester having, under ordinary conditions, an extremely low vapor pressure is required. However, the products have been found to be peculiarly well adapted to the manufacture of nitrocellulose compositions where plasticized products are desired. For this purpose, one part of the ester may be mixed with two or more parts of the nitrocellulose, which preferably has been dissolved in a suitable solvent mixture, that may include: ethyl acetate, butyl acetate, and/or toluol. The manner of employing these compositions for this purpose is well understood to those skilled in the art, and is widely varied according to the use to be made of the ultimate nitrocellulose product. Coating compositions made of nitrocellulose which include the ester composition contemplated by this invention are characterized by their resistance to the usual weathering conditions without substantial deterioration and loss of gloss or luster as compared to plasticizers now employed.

The esters contemplated by this invention may likewise be employed advantageously in the manufacture of resins such as those obtained by the interaction of a phenol and an aldehyde as well as those obtained by the interaction of polyhydric-alcohols and one or more carboxylic acids. For this purpose, the ester is incorporated with the resin in a manner well understood by those skilled in the art.

Although several examples of my invention are herein fully set forth, and I have indicated certain modifications which may be practiced, the invention is not so limited, but contemplates broadly a class of novel phenyl esters of dicarboxylic acids characterized in that they are mixed phenolic esters of dicarboxylic acids which upon hydrolysis yield a mixture of phenols of the benzene series, consisting of two or more of the following: phenol, para cresol, meta cresol, ortho cresol, and the xylenols, and uses therefor.

What I claim is:

1. A neutral phthalic acid ester of a plurality of phenols of the benzene series, said ester product being insoluble in water, inseparable into neutral esters of phthalic acid and a single phenolic isomer, and upon hydrolysis with an alkali yielding a mixture of phenols and the alkali metal salt of phthalic acid.

2. A neutral phthalic acid ester of mixed cresols, said ester product being insoluble in water, inseparable into neutral esters of phthalic acid and a single cresol isomer, and upon hydrolysis with an alkali yielding a mixture of cresylic acid and the alkali metal salt of phthalic acid.

3. In the manufacture of neutral water insoluble phenolic esters of phthalic acid, the step in the purification which involves agitating the ester while in a liquid state with an aqueous alkali metal permanganate solution, separating the precipitated manganese dioxide and water soluble products, and finally recovering and drying the ester.

LUCAS P. KYRIDES.